(12) United States Patent
Enari

(10) Patent No.: US 6,317,518 B1
(45) Date of Patent: *Nov. 13, 2001

(54) IMAGE CODING APPARATUS

(75) Inventor: Masahiko Enari, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/781,066

(22) Filed: Jan. 9, 1997

Related U.S. Application Data

(63) Continuation of application No. 08/426,797, filed on Apr. 24, 1995, now abandoned.

(30) Foreign Application Priority Data

Apr. 28, 1994 (JP) ...................................................... 6-114165

(51) Int. Cl.[7] ...................................................... G06K 9/36
(52) U.S. Cl. .......................... 382/232; 382/236; 382/238; 375/240.13
(58) Field of Search ..................................... 382/232, 236, 382/238; 348/402, 404, 405, 700; 375/240.13, 240.26, 240.01

(56) References Cited

U.S. PATENT DOCUMENTS

| | | | |
|---|---|---|---|
| 5,241,383 | * 8/1993 | Chen et al. | 348/405 |
| 5,267,334 | * 11/1993 | Normille et al. | 382/236 |
| 5,333,013 | 7/1994 | Enari et al. | 348/405 |
| 5,351,086 | * 9/1994 | Park | 348/402 |
| 5,379,356 | * 1/1995 | Purcell et al. | 382/236 |
| 5,400,075 | * 3/1995 | Savatier | 348/384 |
| 5,459,517 | * 10/1995 | Kunitake et al. | 375/240.13 |

* cited by examiner

*Primary Examiner*—Jose L. Couso
*Assistant Examiner*—Anh Hong Do
(74) *Attorney, Agent, or Firm*—Fitzpatrick, Cella, Harper & Scinto

(57) ABSTRACT

An image coder includes an input unit for inputting an image signal, a coding unit for coding the image signal by adaptively switching a first coding mode for performing intraframe coding and a second coding mode for performing interframe coding, and a command unit for outputting a command to the coding unit to forcibly execute the first coding mode. The command unit outputs a command at intervals controlled in accordance with the quantity of coded data generated when the image signal is coded. Alternatively, the image coder includes an input unit for inputting an image signal, a detection unit for detecting the activity of the image signal input by the input unit, a coding unit for coding the image signal by adaptively switching a first coding mode for performing intraframe coding and a second coding mode for performing interframe coding, and a command unit for outputting a command to the coding unit to forcibly execute the first coding mode. The command unit outputs a command at intervals controlled in accordance with an output from the detection unit.

23 Claims, 5 Drawing Sheets

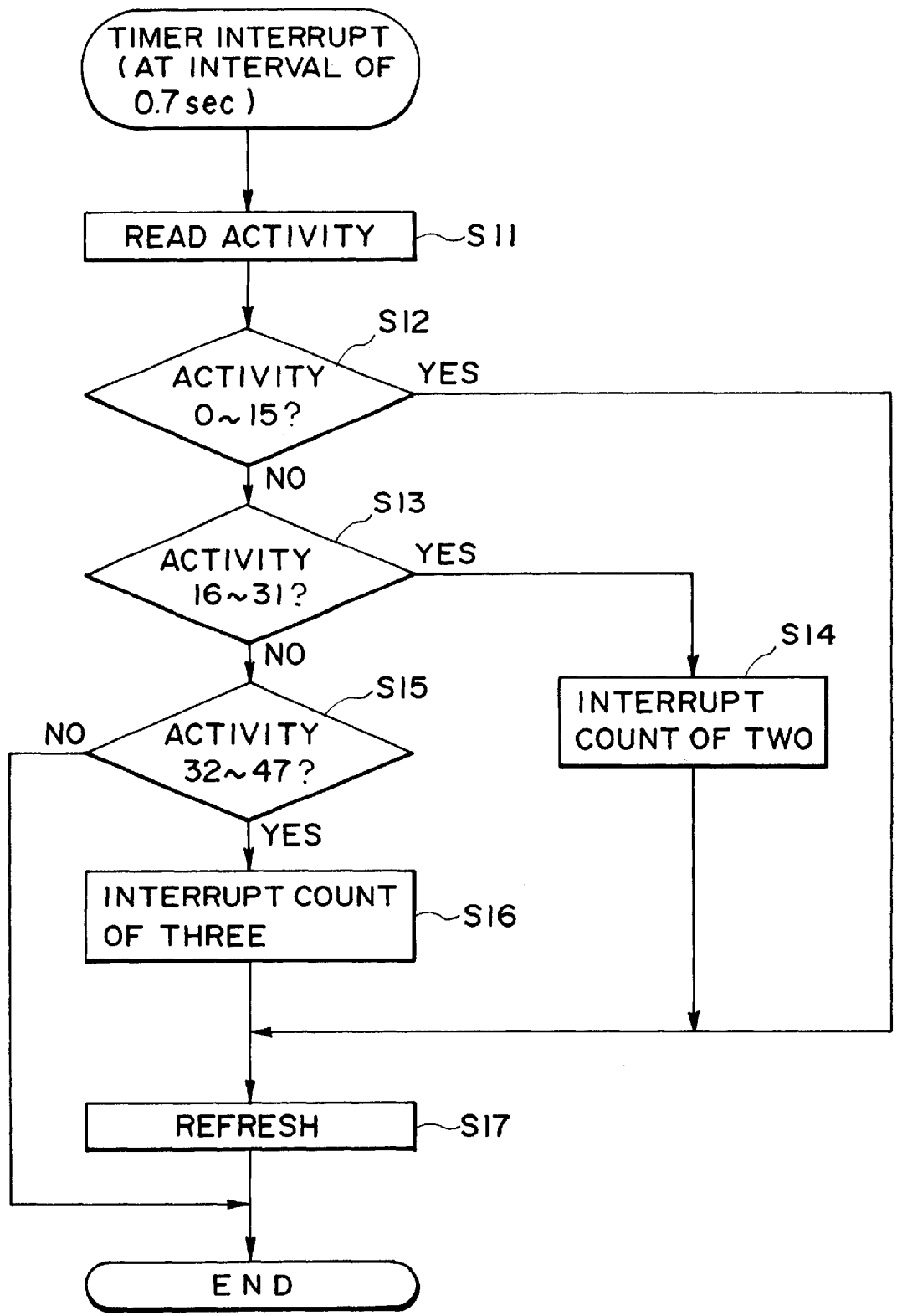
F I G. 5

IMAGE CODING APPARATUS

This application is a continuation of application Ser. No. 08/426,797 filed Apr. 24, 1995, now abandoned.

BACKGROUND OF THE INVENTION

1. Field of the Invention

The present invention relates to an image coding apparatus and, more particularly, to an image coding apparatus for coding an image signal by adaptively switching coding based on an inter-mode (interframe (or interfield) prediction coding) and coding based on an intra-mode (intraframe (or intrafield) coding).

2. Related Background Art

Various coding schemes have been proposed to reduce the data quantity in coding a motion image signal.

According to one of the proposed coding schemes, coding is performed by switching coding based on the intra-mode (intraframe coding) and coding based on the inter-mode (interframe prediction coding).

A motion image can be regarded as a continuous display of independent images along a time axis.

Intraframe coding is a compression coding scheme suitable for an image having a low correlation in the direction of time, e.g., an image exhibiting quick movement, or an image having no correlation in the direction of time, e.g., an image having undergone a scene change. That is, intraframe coding is designed to perform compression coding by using similarities between adjacent pixels.

Interframe prediction coding is a compression coding scheme suitable for an image exhibiting a small movement. That is, interframe prediction coding is based on the fact that the correlation between frames of an image exhibiting a small movement is high in the direction of time. In interframe prediction coding, therefore, compression coding is performed by calculating prediction values of image data to be coded from an adjacent image, calculating differences between the calculated prediction values and the image data to be coded, and coding the calculated differences.

It is known that in a conventional coding apparatus, when an error occurs in data in coding based on the inter-mode, the error generally propagates.

Coding based on the intra-mode is, therefore, forcibly performed at predetermined time intervals (e.g., one sec) to eliminate the influences of errors mixed in data at the predetermined time intervals. That is, refresh processing is performed.

Assume that coding based on the intra-mode is periodically performed for refresh processing, and for example, refresh processing is performed for a high-resolution image or an image exhibiting a low correlation between frames. In this case, since the quantization step for a reduction in data quantity in coding is abruptly coarsened, a deterioration in image quality become conspicuous. In addition, if images like the above images continuously appear, a deterioration in image quality caused by refresh processing occurs at every refresh period, making the deterioration in image quality even more conspicuous.

SUMMARY OF THE INVENTION

The present invention has been made in consideration of the above situation, and has as its object to provide an image coding apparatus which executes refresh processing inconspicuously to prevent the propagation of an error in the image-coded data.

In order to achieve the above object, according to an aspect of the present invention, there is provided an image coding apparatus which includes input means for inputting an image signal, coding means for coding the image signal by adaptively switching a first coding mode for performing intraframe coding and a second coding mode for performing interframe coding, and command means for outputting a command to the coding means to forcibly execute the first coding mode, the command means outputting a command at the intervals controlled in accordance with the quantity of coded data generated when the image signal is coded.

In addition, according to another aspect of the present invention, there is provided an image coding apparatus which includes input means for inputting an image signal, detection means for detecting the activity of the image signal input by the input means, coding means for coding the image signal by adaptively switching a first coding mode for performing intraframe coding and a second coding mode for performing interframe coding, and command means for outputting a command to the coding means to forcibly execute the first coding mode, the command means outputting a command at the intervals controlled in accordance with an output from the detection means.

Other objects, features and advantages of the invention will become apparent from the following detailed description taken in conjunction with the accompanying drawings.

BRIEF DESCRIPTION OF THE DRAWINGS

FIG. 5 is a flow chart showing a control operation for refresh intervals in the second embodiment of the present invention.

DETAILED DESCRIPTION OF THE PREFERRED EMBODIMENT

An embodiment of the present invention will be described below with reference to the accompanying drawings.

Note that an image coding apparatus of this embodiment is a motion compensation interframe adaptive DCT (discrete cosine transform) coding apparatus for coding an HDTV signal of an interlace scheme in which the number of scanning lines is 1,125, and the field frequency is 60 (frames/sec).

Figure 1:
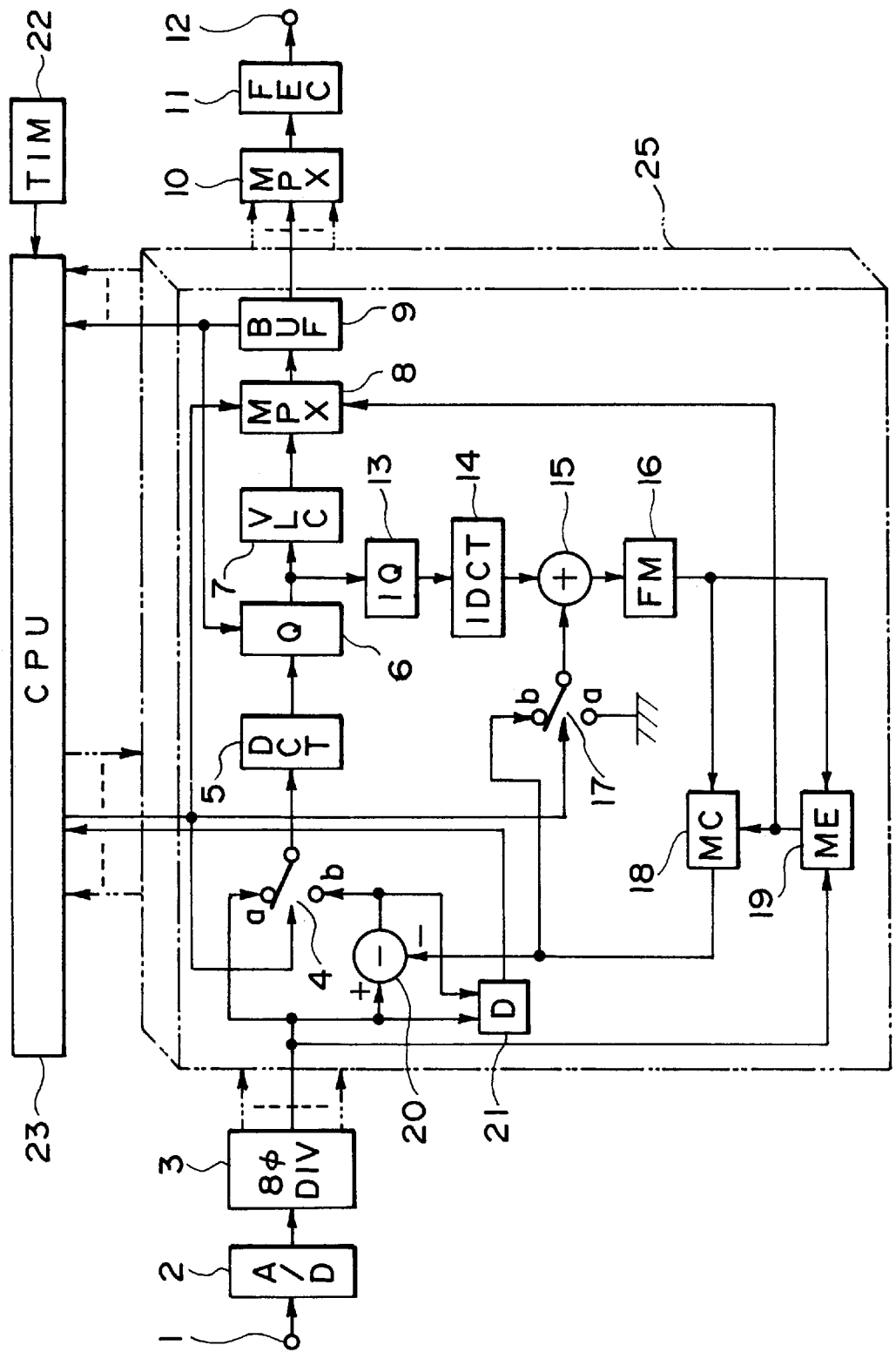
FIG. 1 is a block diagram showing an arrangement of an image coding apparatus according to a first embodiment of the present invention.
Figure 2:
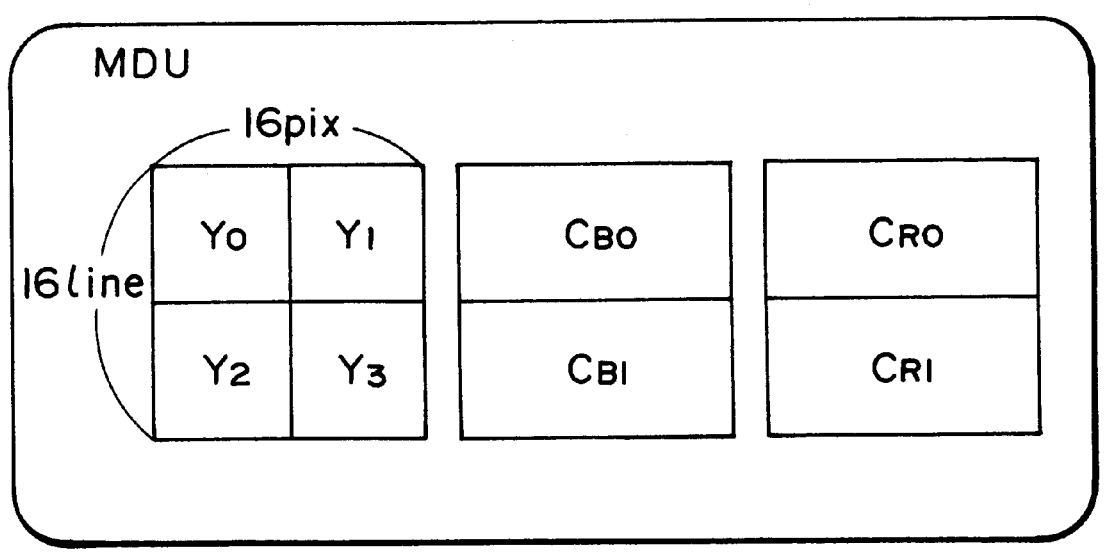
FIG. 2 is a view showing an arrangement of a MDU as a unit of coding processing.

FIG. 1 is a block diagram showing the arrangement of an image coding apparatus according to the first embodiment of the present invention.

Referring to FIG. 1, an A/D (analog/digital) circuit 2 band-limits a luminance signal in an analog image signal input from an input unit 1 to a band of 30 MHz, and color difference signals PB and PR to a band of 15 MHz. The A/D circuit 2 then samples the luminance signal at 74.25 MHz, and the color difference signals PB and PR at 37.125 MHz, thereby converting the analog signal into a digital image signal. As a result of this operation, the number of pixels in the horizontal direction becomes 2,200.

The A/D circuit 2 supplies the digital image signal to an eight-phase dividing circuit (8φDIV) 3. The eight-phase dividing circuit 3 removes the horizontal blanking portion of the input digital signal to obtain 1,920-pixel data as the effective portion of the frame, and phase-divides the portion into eight phases. In addition, the eight-phase dividing circuit 3 forms the phase-divided image signal into DCT blocks consisting of eight pixels (in the horizontal direction)×eight pixels (in the vertical direction) so as to form one MDU (Minimum Data Unit) consisting of eight DCT blocks, i.e., four DCT blocks Y0, Y1, Y2, and Y3 corresponding to the luminance signal, two DCT blocks CB0 and CB1 corresponding to the color difference signal PB, and two DCT blocks CR0 and CR1 corresponding to the color difference signal PR.

The luminance signal, the color difference signal PB, and the color difference signal PR are multiplexed in the order named to form a time base multiplex signal. The eight phase portions of the signal are then output to coding blocks 25 in a parallel manner. That is, in this embodiment, a one-frame image signal is divided into eight portions in the form of strips to be processed. The processing speed per phase is 18.5625 MHz. Although FIG. 1 shows only the detailed arrangement of one of the coding blocks 25 arranged in parallel for eight phases, the remaining seven blocks have the same arrangement as that shown in FIG. 1.

The phase-divided image signal is supplied to a terminal a of a first intra/inter selection switch 4, a subtracter 20, a determination circuit (D) 21, and a motion vector detection circuit (ME) 19.

A terminal b of the first intra/inter selection switch 4 is connected to the output terminal of the subtracter 20. The selection switch 4 selects a signal input to the terminal a or the terminal b in accordance with a control signal from a CPU 23, and supplies the signal to a discrete cosine transform circuit (DCT) 5.

The discrete cosine transform circuit 5 performs a discrete cosine transform of the input signal according to a size of eight pixels (in the horizontal direction)×eight pixels (in the vertical direction), and supplies the resultant signal to a quantization circuit (Q) 6. The quantization circuit 6 quantizes the input signal and supplies it, as a quantization coefficient, to a coding circuit (VLC) 7 and an inverse quantization circuit (IQ) 13.

The coding circuit 7 codes the input coefficient into a variable-length code (compressed digital signal) by using a two-dimensional Huffman code or the like, and supplies it to a multiplexer (MPX) 8. The multiplexer 8 multiplexes the input signal and supplies the resultant signal to a buffer memory (BUF) 9.

The multiplexer 8 is connected to the CPU 23 and the motion vector detection circuit (ME) 19. A motion vector output from the motion vector detection circuit 19 (to be described later), intra/inter selection information output from the CPU 23, and coded data output from the coding circuit 7 are multiplexed.

The buffer memory 9 temporarily stores a coded image signal. At the same time, the buffer memory 9 always monitors the buffer memory occupation quantity (the occupation quantity or ratio of coded data stored in the buffer memory) and feeds back a transmission factor (TF) value corresponding to the buffer memory occupation quantity to the quantization circuit 6 and the CPU 23.

The quantization circuit 6 controls the quantization step for controlling the quantity of coded data generated from image data upon coding in accordance with the TF value output from the buffer memory 9 so as to keep the buffer memory occupation quantity to a predetermined occupation quantity.

The above TF value is to fall within the range of 0 to 64. In this case, the TF value of a general image falls within the range of 16 to 47, the TF value of an image having a very small information quantity, e.g., "a color bar" or "a still image or a monotonous image exhibiting slow movement" as a natural image falls within the range of 0 to 15, and the TF value of "an image obtained by performing panning photography of a large audience at a long distance at a speed exceeding the range of motion compensation" or "an image having an object of interest in a state which can hardly be discriminated from noise" falls within the range of 48 to 63.

Each coding block 25 supplies the coded data to a multiplexer 10. The multiplexer 10 multiplexes the coded data from each coding block 25, and supplies the multiplexed data to a parity addition circuit (FEC) 11. The parity addition circuit 11 adds a parity check code to the input data to allow a decoding apparatus at the transmission destination to correct an error in a transmission line. The parity addition circuit 11 then outputs the resultant data to an external unit via an output unit 12.

In the coding block 25, the output unit (IQ) 13 inversely quantizes the quantized data output from the quantization circuit 6 to convert the data into a DCT coefficient including a quantization error, and supplies the coefficient to an inverse discrete cosine transform circuit (IDCT) 14.

The inverse discrete cosine transform circuit 14 performs inverse discrete cosine transform of the input DCT coefficient according to a size of eight pixels (in the horizontal direction)×eight pixels (in the vertical direction), and supplies the resultant data to an addition circuit 15.

The addition circuit 15 adds the data output from the inverse discrete cosine transform circuit 14 to data selected by a second intra/inter selection switch 7, and supplies the resultant data to a frame memory (FM) 16.

The frame memory 16 stores one-frame data of the image data output from the addition circuit 15, and supplies the stored image data to a motion compensation circuit (MC) 18 and the motion vector detection circuit (ME) 19.

In order to improve the prediction efficiency, the motion vector detection circuit 19 compares the image signal of the preceding frame from the frame memory 16 with the image signal (image signal to be coded) from the eight-phase dividing circuit 3 in units of MDUs, and searches the image signal of the preceding frame for a portion similar to the image signal to be coded, thereby detecting a motion vector indicating the moving direction and amount of the image signal to be coded.

The motion compensation circuit 18 calculates prediction data by using the image signal from the frame memory 16 and the motion vector output from the motion vector detection circuit 19. The calculated prediction data is supplied to the terminal b of the second intra/inter selection switch 17 and the subtracter 20. Note that a terminal a of the second intra/inter selection switch 17 is grounded.

The subtracter 20 calculates differences by subtracting the prediction data output from the motion compensation circuit 18 from the image signal output from the eight-phase dividing circuit 3.

The calculated differences are supplied to the terminal b of the first intra/inter selection switch 4 and the determination circuit 21.

The determination circuit 21 compares the image signal from the eight-phase dividing circuit 3 with the differences to determine which mode, i.e., the intra-mode or the inter-mode, is more advantageous in coding in terms of coding efficiency (compression efficiency), and supplies a determination signal indicating the determination result to the CPU 23.

The CPU 23 outputs a control signal to the first and second intra/inter selection switches 4 and 17 on the basis of the determination signal from the determination circuit 21 so as to perform switching control of the selection switches 4 and 17, and performs a refresh operation (to be described later).

A timer circuit (TIM) 22 is connected to the CPU 23. The timer circuit 22 generates an interrupt to the CPU 23 at predetermined time intervals (e.g., 0.7 sec).

An intra-mode/inter-mode selecting operation and a refresh operation in the image coding apparatus having the above arrangement will be described below.

First of all, if the determination circuit 21 determines that coding based on the intra-mode is more advantageous, the first intra/inter selection switch 4 selects the terminal a in accordance with a control signal from the CPU 23 to supply an image signal from the eight-phase dividing circuit 3 to the discrete cosine transform circuit 5.

In addition, the terminal a is selected by the second intra/inter selection switch 17, so that no signal is input to one input terminal of the addition circuit 15.

In this case, an image signal from the inverse discrete cosine transform circuit 14 is input to the other input terminal of the addition circuit 15 and is stored in the frame memory 16. The signal stored in the frame memory 16 is almost identical to a signal input from the eight-phase dividing circuit 3 to each coding block 25.

If the determination circuit 21 determines that coding based on the inter-mode is more advantageous, the first intra/inter selection switch 4 selects the terminal b in accordance with a control signal from the CPU 23 so as to supply differences output from the subtracter 20 to the discrete cosine transform circuit 5.

In addition, the terminal b is selected by the second intra/inter selection switch 17, so that an output signal from the motion compensation circuit 18 is supplied to one input terminal of the addition circuit 15.

In this case, since an output signal from the inverse discrete cosine transform circuit 14 is input to the other input terminal of the addition circuit 15, the signal stored in the frame memory 16 is almost identical to a signal output from the eight-phase dividing circuit 3 to each coding block 25.

In the inter-mode, an image decoding apparatus, which receives a signal from the output unit 12, decodes the transmitted coded data of differences into the original differences, and adds them to an image signal corresponding the preceding frame and stored in the apparatus, thereby generating an image signal corresponding to the next frame. The generated signal is then stored in a memory in the apparatus.

The CPU 23 reads out a TF value indicating the quantity of coded data generated from the buffer memory 9 in accordance with an interrupt signal from the timer circuit 22. The CPU 23 also outputs refresh instructions to the first and second intra/inter selection switches 4 and 17 to forcibly and temporarily switch each selection terminal to the terminal a at time intervals determined by the timer interrupt and the above TF value in accordance with a control flow to be described later. In a refresh operation in this embodiment, areas on vertical stripes of seven consecutive MDUs are moved over the screen from left to right at a constant rate of 3 MDUs/field. In performing coding based on the intra-mode, coding based on the intra-mode is performed regardless of a refresh operation. That is, in the CPU 23, the determination result obtained by the determination circuit 21 and the refresh instruction are logically ORed (logical OR).

A control operation for determining time intervals at which the CPU 23 outputs a refresh instruction will be described next with reference to FIG. 3.

Figure 3:
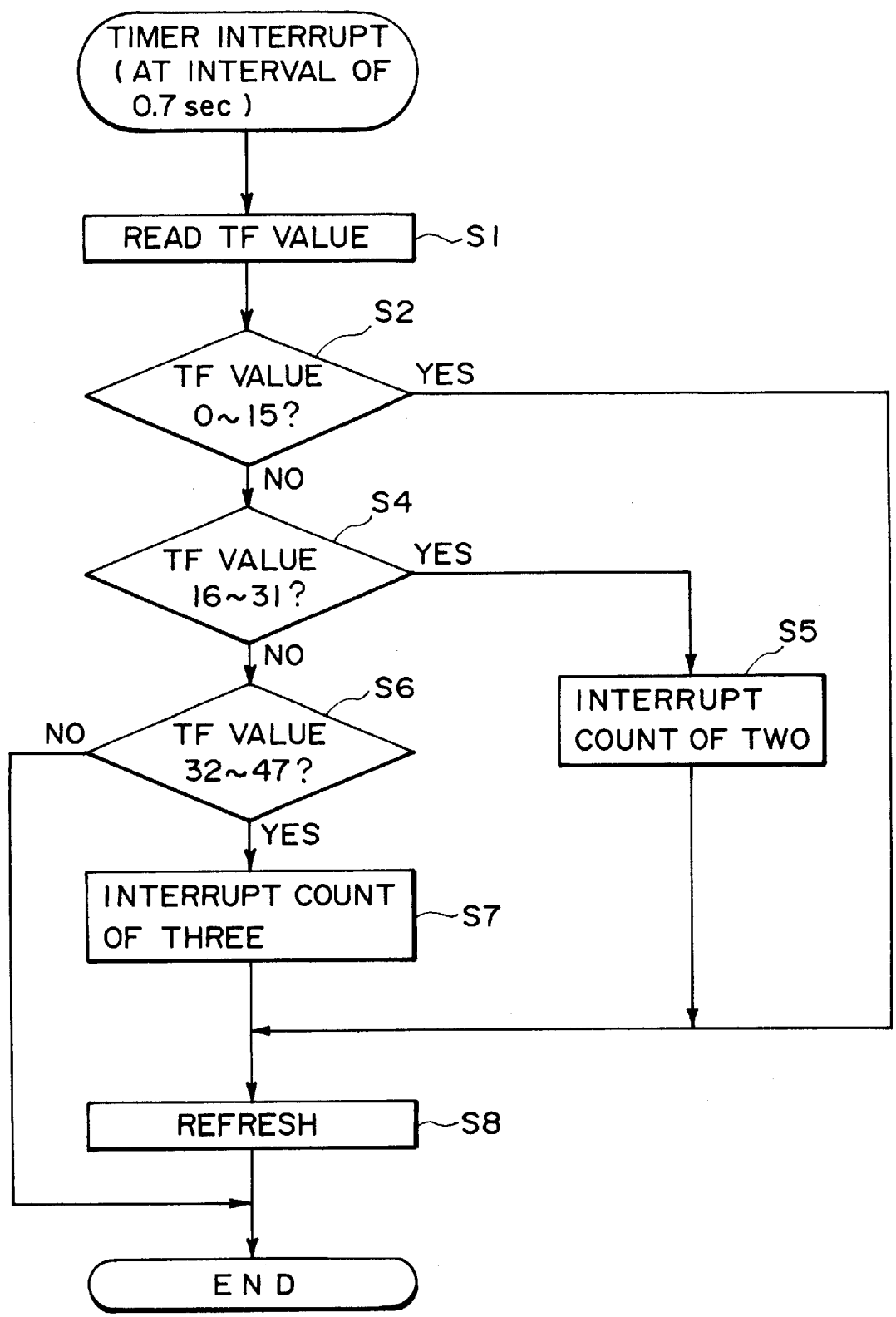
FIG. 3 is a flow chart showing a control operation for refresh intervals in the first embodiment of the present invention.

Referring to FIG. 3, the CPU 23 starts interrupt processing in response to an interrupt signal from the timer circuit 22, and loads a TF value from the buffer memory 9 (step S1). If the TF value falls within the range of 0 to 15, the correlation of an image to be coded is very high, and the quantity of coded data generated is relatively small. Even if, therefore, refresh processing is frequently performed, no deterioration in the appearance of the image occurs. For this reason, refresh processing is performed at time intervals of 0.7 sec as general timer interrupt intervals (steps S2 and S8).

If the TF value falls within the range of 16 to 31, the correlation of the image to be coded is relatively low, and the quantity of coded data generated increases, leading to conspicuous refresh processing. Therefore, in order to prolong the refresh intervals, refresh processing is performed after two interrupt pulses are counted (steps S4, S5, and S8). That is, refresh processing is performed at time intervals of 1.4 sec.

If the TF value falls within the range of 32 to 47, the correlation of the image to be coded is lower. If, therefore, refresh processing is frequently performed, refresh processing becomes conspicuous. For this reason, refresh processing is performed after three interrupt pulses are counted (steps S6, S7, and S8). That is, refresh processing is performed at time intervals of 2.1 sec.

If the TF value falls within the range of 48 to 63 (NO in step S6), the correlation of the image to be coded is considerably low. If refresh processing is performed in this state, a refresh period becomes very conspicuous, resulting in a deterioration in the appearance of the image. In this case, therefore, no refresh processing is performed.

The purpose of refresh processing is to restore an image signal (to be transmitted) to a correct image signal by forcibly switching transmission of coded data based on the inter-mode to transmission of coded data based on the intra-mode when, for example, an error is caused in a transmission line or a transmission line is switched to another line. A disturbed image signal cannot be restored to the original signal unless refresh processing is performed. The probability that such an error in a transmission line or transmission switching occurs simultaneously with input of an image signal having a TF value of 48 or more is very low, and hence no practical problems are posed.

As described in detail above, according to the image coding apparatus of this embodiment, a coded data information quantity is detected by using the buffer memory occupation quantity of the buffer memory 9, and the time intervals at which refresh processing is performed are determined in accordance with the detected coded data information quantity. Therefore, no deterioration in appearance occurs even at an image portion having a low intraframe or interframe correlation.

The second embodiment of the present invention will be described next with reference to FIGS. 4 and 5.

Figure 4:
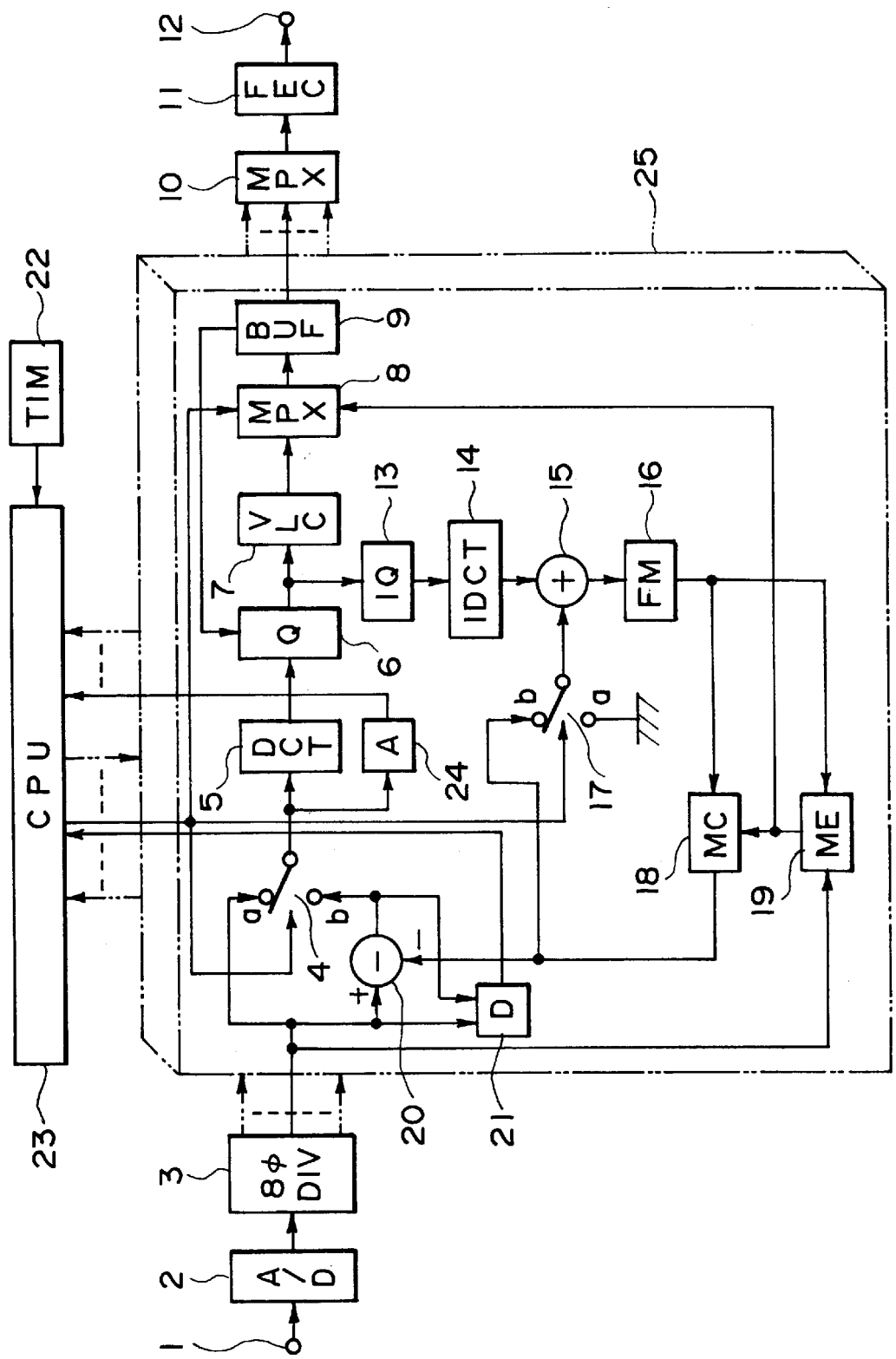
FIG. 4 is a block diagram showing an arrangement of an image coding apparatus according to a second embodiment of the present invention.

FIG. 4 is a block diagram showing the arrangement of an image coding apparatus according to the second embodiment of the present invention. The same reference numerals in FIG. 4 denote the same parts as in FIG. 1, and a description thereof will be omitted.

In the apparatus shown in FIG. 4, an activity detection circuit (A) 24 for detecting the activity (correlation of an image) of a MDU to be coded is connected to the output line of the first intra/inter selection switch 4 in the apparatus of the first embodiment shown in FIG. 1, and a detection signal obtained by the activity detection circuit 24 is supplied to the CPU 23.

Note that in the second embodiment, a TF value indicating the buffer memory occupation quantity of a buffer memory 9 is not supplied to the CPU 23.

The arrangement of the apparatus in FIG. 4 is the same as that of the apparatus in FIG. 1 except for the above point.

The operation (points different from the operation of the apparatus in FIG. 1) of the apparatus in FIG. 4 will be described next.

The activity detection circuit 24 obtains the sum total of the absolute values of adjacent pixels of each MDU in the intra-mode, and obtains the sum total of the absolute values of differences from a subtracter 20 in the inter-mode. The activity detection circuit 24 normalizes the obtained sum total of the absolute values within the range of 0 to 64, thus performing activity detection. By detecting the activity, the information quantity of the image signal (quantity of coded data generated) can be determined.

The activity of a general image falls within the range of 16 to 47, the activity of an image having a very small information quantity, e.g., "a color bar" or "a still image or a monotonous image exhibiting slow movement" as a natural image falls within the range of 0 to 15, and the activity of "an image obtained by performing panning photography of a large audience at a long distance at a speed exceeding the range of motion compensation" or "an image having an object of interest in a state which can hardly be discriminated from noise" falls within the range of 48 to 63.

A control operation for determining time intervals at which the CPU 23 outputs a refresh instruction will be described next with reference to FIG. 5.

Referring to FIG. 5, the CPU 23 starts interrupt processing in response to an interrupt signal from a timer circuit 22, and reads out an activity from the activity detection circuit 24 (step S11). If the activity falls within the range of 0 to 15, the correlation of an image to be coded is very high, and it can be determined that the quantity of coded data generated is relatively small. Even if, therefore, refresh processing is frequently performed, no deterioration in the appearance of the image occurs. For this reason, refresh processing is performed at time intervals of 0.7 sec as general timer interrupt intervals (steps S12 and S17).

If the activity falls within the range of 16 to 31, the correlation of the image to be coded is relatively low, and it can be determined that the quantity of coded data generated increases. In this case, refresh processing becomes conspicuous. Therefore, in order to prolong the refresh intervals, refresh processing is performed after two interrupt pulses are counted (steps S13, S14, and S17). That is, refresh processing is performed at time intervals of 1.4 sec.

If the activity falls within the range of 32 to 47, the correlation of the image to be coded is lower. If, therefore, refresh processing is frequently performed, refresh processing becomes conspicuous. For this reason, refresh processing is performed after three interrupt pulses are counted (steps S15, S16, and S17). That is, refresh processing is performed at time intervals of 2.1 sec.

If the activity falls within the range of 48 to 63 (NO in step S15), the correlation of the image to be coded is considerably low. If refresh processing is performed in this state, a refresh period becomes very conspicuous, resulting in a deterioration in the appearance of the image. In this case, therefore, no refresh processing is performed.

The purpose of refresh processing is to restore an image signal (to be transmitted) to a correct image signal by forcibly switching transmission of coded data based on the inter-mode to transmission of coded data based on the intra-mode when, for example, an error is caused in a transmission line or a transmission line is switched to another line. A disturbed image signal cannot be restored to the original signal unless refresh processing is performed. The probability that such an error in a transmission line or transmission switching occurs simultaneously with input of an image signal having an activity of 48 or more is very low, and hence no practical problems are posed.

In this embodiment as well, in one refresh operation, areas on vertical stripes of seven consecutive MDUs are moved over the screen from left to right at a constant rate of 3 MDUs/field. In addition, if the determination circuit 21 determines that coding based on the intra-mode is more advantageous,the intra-mode is set regardless of refresh processing. That is, in the CPU 23, the determination result obtained by the determination circuit 21 and the refresh instruction are logically ORed (logical OR).

As described in detail above, according to the image coding apparatus of this embodiment, a coded data information quantity is determined by using an activity, and the time intervals at which refresh processing is performed are determined in accordance with the activity. Therefore, no deterioration in appearance occurs even at an image portion having a low intraframe or interframe correlation.

As has been described in detail above, according to the image coding apparatus, since the intervals at which intraframe coding is performed are forcibly adjusted on the basis of the quantity of coded information generated, flicker and a deterioration in the appearance on the screen caused by refresh processing can be prevented.

Various changes and modifications of the embodiments can be made without departing from the spirit and scope of the invention.

For example, each embodiment described above has exemplified the motion compensation interframe adaptive DCT coding apparatus for coding an HDTV signal of the interlace scheme in which the number of scanning lines is 1,125, and the field frequency is 60 (frames/sec). However, the present invention is not limited to this, and may be applied to any image coding apparatus for adaptively switching interframe prediction coding and intraframe coding, as long as it forcibly performs intraframe coding with respect to all or part of a frame.

In addition, the embodiments described above respectively use the schemes of using a buffer memory occupation quantity and the activity of an image to detect the quantity of coded information generated. However, the present invention is not limited to this, and such an operation can be easily realized by directly detecting the quantify of coded data generated from coded data output from the coding circuit 7.

In other words, the foregoing description of embodiments has been given for illustration purposes only and is not to be construed as imposing any limitation in any respect.

The scope of the invention is, therefore, to be determined solely by the following claims and is not limited by the text of the specifications and alterations made within a scope equivalent to the scope of the claims that fall within the true spirit and scope of the invention.

What is claimed is:

1. A coding apparatus comprising:
    a) input means for inputting an image signal;
    b) coding means for coding the image signal input by said input means, said coding means for adaptively executing a first coding mode for performing intra-picture coding and a second coding mode for performing inter-picture coding, said coding means for selecting the coding mode on a unit of a predetermined data amount of the image signal and forcibly selecting the first coding mode at first predetermined time intervals so that the second coding mode is prevented from being executed continuously during each first predetermined time interval; and
    c) change means for changing the length of each first predetermined time interval to cause said coding means to select the first coding mode at second predetermined time intervals.

2. An apparatus according to claim 1, wherein said change means changes the length of each first predetermined interval according to a quantity of coded data of the image signal.

3. An apparatus according to claim 1, further comprising a buffer memory for temporarily storing the coded data to be read out at a predetermined transmission rate.

4. An apparatus according to claim 3, wherein the quantity of coded data generated is determined by a data occupation quantity of said buffer memory.

5. An apparatus according to claim 3, wherein said coding means includes quantization means for quantizing the image signal input by said input means.

6. An apparatus according to claim 5, further comprising control means for controlling a quantization step of said quantization means in accordance with a remaining data quantity of said buffer memory.

7. An apparatus according to claim 5, further comprising:
    detection means for detecting an activity of the image signal input by said input means; and
    control means for controlling a quantization step of said quantization means in accordance with the activity detected by said detection means.

8. A coding apparatus comprising:
    a) block forming means for forming a block of sample values of an input signal;
    b) coding means having a first coding mode in which the block of the input signal is coded by using data representative of differences between prediction values and the sample values of the block, and a second coding mode in which the block of the input signal is coded without using data representative of differences, said coding means for selecting the coding mode on a unit of a predetermined data amount of the image signal and forcibly selecting the first coding mode at first predetermined time intervals so that the second coding mode is prevented from being executed continuously during each first predetermined time interval; and
    c) change means for changing the length of each first predetermined time interval according to the input signal to cause said coding means to select the first coding mode at second predetermined time intervals.

9. An apparatus according to claim 8, further comprising:
    comparing means for comparing a data quantity of the data representative of a difference with a data quantity of data representative of the sample values, wherein said coding means selects one from among the coding modes in accordance with a comparison result of said comparing means.

10. An apparatus according to claim 8, further comprising a buffer memory for temporarily storing the coded data to be read out at a predetermined transmission rate.

11. An apparatus according to claim 10, wherein said coding means includes quantization means for quantizing the image signal input by said input means.

12. An apparatus according to claim 11, further comprising control means for controlling a quantization step of said quantization means in accordance with a data occupation quantity of said buffer memory.

13. An apparatus according to claim 8, wherein said changing means changes the length of each first predetermined time interval according to a quantity of coded data of the input signal.

14. An apparatus according to claim 13, further comprising
    detection means for detecting an activity of the image signal input by said input means, so that the quantity of coded data generated is determined by the activity detected by said detection means.

15. A coding apparatus comprising:
    a) input means for inputting an image signal;
    b) detection means for detecting an activity of the image signal input by said input means;
    c) coding means for coding the image signal input by said input means,
        said coding means for adaptively executing a first coding mode for performing intra-picture coding and a second coding mode for performing inter-picture coding, said coding means selecting the coding mode on a unit of a predetermined data amount of the image signal and forcibly selecting the first coding mode at first predetermined time intervals so that the second coding mode is prevented from being executed continuously during each first predetermined time interval; and
    d) change means for changing the length of each first predetermined time interval according to the activity detected by said detection means to cause said coding means to select the first coding mode at second predetermined time intervals.

16. An apparatus according to claim 15, wherein the activity is data representative of a correlation of an image.

17. An apparatus according to claim 15, further comprising:
    comparing means for comparing a data quantity of the data representative of a difference with a data quantity of data representing the same values, wherein said coding means selects one from among the coding modes in accordance with a comparison result of said comparing means.

18. An apparatus according to claim 15, further comprising
    a buffer memory for temporarily storing the coded data to be read out at a predetermined transmission rate.

19. An apparatus according to claim 18, wherein said coding means includes quantization means for quantizing the image signal input by said input means.

20. An apparatus according to claim 19, further comprising control means for controlling a quantization step of said quantization means in accordance with a data occupation quantity of said buffer memory.

21. A coding method comprising the steps of:
a) inputting an image signal;
b) coding the image signal input by said input step, said coding step adaptively executing a first coding mode for performing intra-picture coding and a second coding mode for performing inter-picture coding, and said coding step selecting the coding mode on a unit of a predetermined data amount of the image signal and forcibly selecting the first coding mode at first predetermined time intervals so that the second coding mode is prevented from being executed continuously during each first predetermined time interval; and
c) changing the length of each first predetermined time interval to cause said coding step to select the first coding mode at second predetermined time intervals.

22. A coding method comprising the steps of:
a) forming a block of sample values of an input signal;
b) executing a first coding mode on which the block of the input signal is coded by using data representative of differences between prediction values and the sample values of the block, and executing a second coding mode in which the block of the input signal is coded without using data representative of differences, said executing step selecting the coding mode on a unit of a predetermined data amount of the image signal and forcibly selecting the first coding mode at first predetermined time intervals so that the second coding mode is prevented from being executed continuously during each first predetermined time interval; and
c) changing the length of the first predetermined time interval according to the input signal to cause said executing step to select the first coding mode at second predetermined time intervals.

23. A coding method comprising the steps of:
a) inputting an image signal;
b) detecting an activity of the image signal input by said input step;
c) coding the image signal input by said input step,
said coding step adaptively executing a first coding mode for performing intra-picture coding and a second coding mode for performing inter-picture coding, said coding step including a step of selecting the coding mode on a unit of a predetermined data amount of the image signal and forcibly selecting the first coding mode at predetermined time intervals so that the second coding mode is prevented from being executed continuously during each first predetermined time interval; and
d) changing the length of each first predetermined time interval according to the activity detected in said detecting step to cause said selecting step to select the first coding mode at second predetermined time intervals.

* * * * *

UNITED STATES PATENT AND TRADEMARK OFFICE
CERTIFICATE OF CORRECTION

| | |
|---|---|
| PATENT NO. | : 6,317,518 B1 |
| APPLICATION NO. | : 08/781066 |
| DATED | : November 13, 2001 |
| INVENTOR(S) | : Masahiko Enari |

It is certified that error appears in the above-identified patent and that said Letters Patent is hereby corrected as shown below:

<u>COLUMN 1</u>

Line 55, "become" should read --becomes--.

<u>COLUMN 2</u>

Line 46, "EMBODIMENT" should read --EMBODIMENTS--.

<u>COLUMN 4</u>

Line 36, "switch 7," should read --switch 17,--..

<u>COLUMN 10</u>

Line 17, "changing" should read --change--.

Signed and Sealed this

Twenty-ninth Day of May, 2007

JON W. DUDAS
*Director of the United States Patent and Trademark Office*